June 20, 1939.     M. A. LOGAN     2,162,894
METHOD AND APPARATUS FOR MEASURING NONLINEAR IMPEDANCES
Filed Jan. 8, 1938     2 Sheets-Sheet 1

INVENTOR
M. A. LOGAN
BY
*G. M. Campbell*
ATTORNEY

June 20, 1939.    M. A. LOGAN    2,162,894
METHOD AND APPARATUS FOR MEASURING NONLINEAR IMPEDANCES
Filed Jan. 8, 1938    2 Sheets-Sheet 2

INVENTOR
M. A. LOGAN
BY
ATTORNEY

Patented June 20, 1939

2,162,894

UNITED STATES PATENT OFFICE 2,162,894

METHOD AND APPARATUS FOR MEASURING NONLINEAR IMPEDANCES

Mason A. Logan, Summit, N. J., assignor to Bell Telephone Laboratories, Incorporated, New York, N. Y., a corporation of New York Application January 8, 1938, Serial No. 184,085

15 Claims. (Cl. 175—183)

This invention relates to a method and apparatus for the measurement of permanently shunted non-linear impedances.

It is sometimes desirable and necessary to determine the magnitude of a non-linear impedance, that is, one whose impedance varies as some function of its terminal voltage even though it is permanently shunted by some other impedance of undetermined fixed value. It has long been regarded as an insurmountable difficulty, if not an actual impossibility, to determine the separate impedances where two are inseparably connected in parallel.

The object of this invention is to provide an apparatus and method which will effectively separate these impedance values.

To attain this object this invention makes use of the discovery of some of the peculiar properties of non-linear impedances. It is known that as the voltage changes from one preselected voltage to another the original magnitude of a nonlinear impedance will lower. This latter value may be regarded as the original plus a parallel connected fictitious impedance. It has been found that at proper preselected voltages there is a fixed relationship between this fictitious value and the magnitude of the original impedance for any particular type of non-linear impedance. The ratio between these two values may be expressed as an empirical constant.

The object is, therefore, attained by providing suitable apparatus and methods for impressing upon the terminals of the permanently shunted non-linear impedance two different voltages of known amount and determining its value from the observed change in network impedance and an empirical constant.

The invention may be better understood by referring to the drawings, in which.

Figure 5:
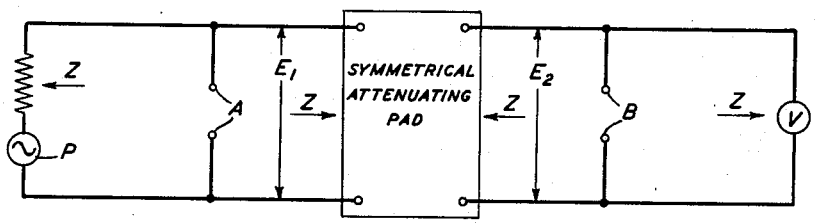
Fig. 5 is a constant impedance reflectionless transmission system also adapted for the measurement of non-linear impedances according to this invention.
Figure 5A:
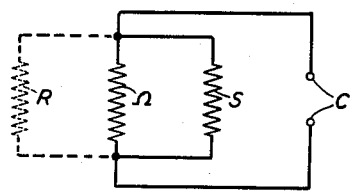
Figure 5B:
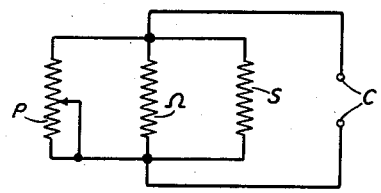

Fig. 5a diagrammatically represents a permanently shunted non-linear impedance with the assumed fictitious impedance R;

Fig. 5b shows the fictitious impedance of Fig. 5a replaced by an equivalent physical impedance P.

Figure 6:
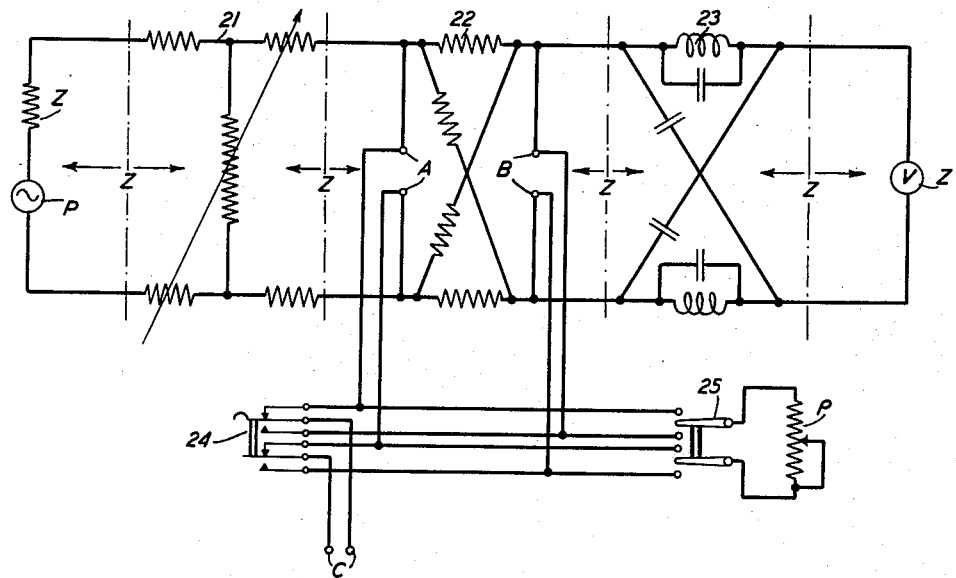

Fig. 6 is a more elaborate form of Fig. 5.

For the purposes of this specification as well as in the appended claims, wherever the terms "impedance" and "resistance" or "resistor" is employed it should be kept in mind that they are mutually interchangeable in so far as the scope of the invention is concerned because from the description that is to follow, it is obvious to any one skilled in the art that by employing the proper indicating instrument and power source (that is, AC instruments for alternating current and DC instruments for direct current) this may be done. By the term "linear impedance or resistor" is meant one whose magnitude remains constant with changing terminal voltage, while by the term "non-linear impedance or resistor" is meant one whose magnitude varies as a function of its terminal voltage.

Figure 1:
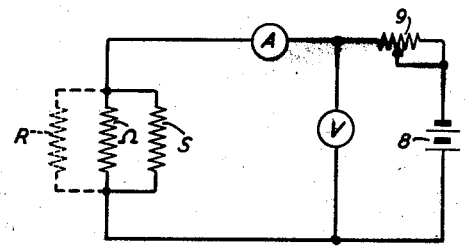
Fig. 1 is a simple form of apparatus embodying the fundamental idea.

Referring now to Fig. 1, $\Omega$ represents the non-linear impedance or resistor whose value actually varies with the impressed voltage while S represents its unknown linear shunting resistor or impedance. When the voltage read by voltmeter V varies so as to lower the magnitude of $\Omega$ it may be thought of as remaining constant while a fictitious shunting impedance R combines with it to form an equivalent parallel network. This may be expressed mathematically by allowing $\omega$ to be the actual variable impedance and $\Omega$ the assumed constant higher impedance as follows:

$$\omega = \frac{R\Omega}{R+\Omega} \quad (1)$$

By definition of terms and from Equation 1 it will be evident that at preselected voltage $V_1$ where $\omega$ equals $\Omega$, that is where the fictitious impedance R is infinite or non-existent as to effect, the following equation is true:

$$V_1 = I_1\left(\frac{\Omega S}{\Omega+S}\right) = I_1 Z \quad (2)$$

where $I_1$ is the current read by ammeter A at voltage $V_1$ and Z is the equivalent parallel impedance of $\Omega$ and S.

It is equally evident that when the voltage is changed to preselected voltage $V_2$ so that $\omega$ has become the value expressed by Equation 1 with the fictitious impedance R present, the following equation is true:

$$V_2 = I_2\left(\frac{RZ}{R+Z}\right) \quad (3)$$

where $I_2$ is the current corresponding to voltage $V_2$ and $Z$ is as defined in Equation 2.

Solving Equation 3 for $R$ and substituting $$\frac{V_1}{I_1}$$

for $Z$ it is found that $$R = \frac{V_2}{I_2 - \frac{V_2}{V_1} I_1} \quad (4)$$

Then from the discovery that the fixed ratio $a$ exists between the fictitious impedance $R$ and the magnitude of the original impedance $\Omega$ at properly preselected test voltages $\Omega$ is thereby measured at the preselected voltage $V_1$. Voltages $V_1$ and $V_2$ are obtained by moving rheostat 9 as required while battery 8 (or a suitable alternating current source) furnishes the power supply.

Figure 2:
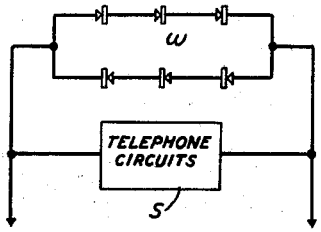
Fig. 2 represents one form of non-linear resistor known as a varistor which may be measured by the method and apparatus of this invention.

The procedure to be followed in making measurements with the apparatus of Fig. 1 is quite simple. Assume that the varistor of Fig. 2 is to be measured while permanently shunted by a telephone set and other circuits having an unknown resistance $S$. The terminals of the varistor of Fig. 2 are connected into the circuit of Fig. 1 as indicated and rheostat 9 is varied until voltmeter $V$ reaches the lower preselected voltage $V_1$. The lower voltage is used because the varistor resistance lowers with increasing voltage. The ammeter reading $I_1$ is observed. Rheostat 9 is then moved until the higher preselected voltage $V_2$ is indicated and the ammeter reading $I_2$ is taken. The varistor resistance $\Omega$ at voltage $V_1$ is then $$\Omega = aR = \frac{aV_2}{I_2 - \frac{V_2}{V_1} I_1} \quad (5)$$

It should be observed that the method of test is exactly the same in principle regardless of whether the non-linear impedance increases with increasing voltage or decreases.

Figure 3:
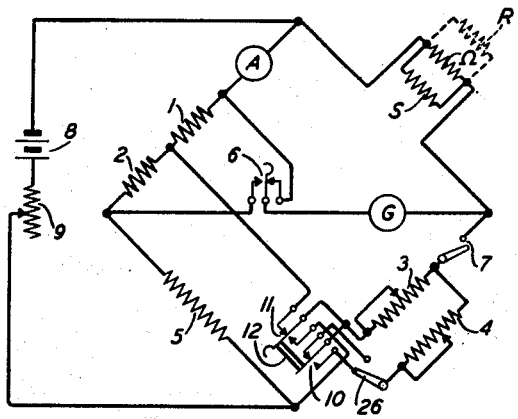
Fig. 3 is one form of Wheatstone bridge adapted to the measurement of non-linear impedances.

In Fig. 3 the invention takes the form of a Wheatstone bridge. As here shown, it is actually a combination of two different Wheatstone bridges with the resistance of ammeter A and resistor 1 forming one pair of ratio arms and rheostat 3 the corresponding measuring arm resistor, while the second bridge is formed by operating switches 6 and 12. In this second bridge resistors 1 and 2 and the ammeter resistance in series comprise one ratio arm resistor, resistor 5 comprises the other ratio arm resistor and parallel connected rheostats 3 and 4 comprise the measuring arm resistor. Two bridges are used as a convenient means of deriving two different preselected voltages for the non-linear device being tested. If the non-linear device is one which increases in resistance with increasing voltage, switch 26 is moved to its other contact which causes calibrated rheostat 4 to parallel rheostat 3 when the lower preselected voltage is applied and therefore becomes a part of the first bridge instead of the second. When the current in ammeter A is kept constant by adjusting rheostat 9, the testing voltage across the non-linear device at one balance of the bridge will be equal to the drop across ammeter A while for the other bridge it will be the drop across ammeter A plus that across resistors 1 and 2. It is evident that by keeping resistors 1, 2 and 5 and the ammeter resistance in series for both bridges the adjustment of rheostat 9 will be reduced to a minimum when switching from one bridge to the other.

For convenience it is desirable that the ammeter resistance be made equal to the resistance of resistor 1 and resistor 5 equal to the ammeter resistance plus that of resistors 1 and 2 in series so that both bridges will have equal ratio arms and rheostats 3 and 4 will be equal to the resistances being measured. It is not necessary, of course, that the ratio arms be equal, but they must have the proper values to give the desired preselected voltages and must have the same ratio for both bridges.

Switch 7 is provided to permit a continuity test of the shunted non-linear impedance before starting the resistance test.

In using this special bridge to test the non-linear device of Fig. 2 the continuity test may first be performed if desired by leaving switches 6 and 12 in the position indicated in Fig. 3 and leaving switch 7 open. The test circuit is continuous if there is a galvanometer deflection. It should be remembered that the resistance of the device lowers with increasing voltage and therefore switch 26 will remain as shown. The resistance test is then performed by closing switch 7 and adjusting rheostat 9 until ammeter A reads the proper current to give the lower preselected voltage. The bridge is balanced by adjusting rheostat 3. At this point the fictitious resistance R is absent and only $S$ and $\Omega$ are balanced in the bridge. Switches 6 and 12 are both operated so that switch blade 10 shunts rheostat 3 with calibrated rheostat 4 while switch blade 11 and switch 6 cooperate to transfer to the second bridge. The resistance of $\omega$ has now varied to the value given by equation 1 due to the appearance of fictitious resistor R. If the varistor and measuring arm resistances are not high compared with the ratio arm resistances it will be necessary to readjust rheostat 9 to bring the ammeter back to the same reading as before. The bridge is rebalanced by adjusting calibrated rheostat 4 which obviously reads directly the fictitious resistance R. If in calibrating the rheostat its scale includes the empirical constant $a$ it will also read directly the resistance $\Omega$ which it is desired to know.

Another method of operating the bridges of Fig. 3 would be to employ equal ratio arms, calibrate rheostat 3 and leave rheostat 4 out of circuit by opening switch 26. Rheostat 3 is then read at both balances and resistance $\Omega$ is obtained from the following relation derived from the balance equations of the bridges.

$$\Omega = a\left(\frac{XY}{X-Y}\right) \quad (6)$$

where $X$ and $Y$ are the first and second rheostat readings respectively and $\Omega$ and $a$ are as before.

Figure 4:
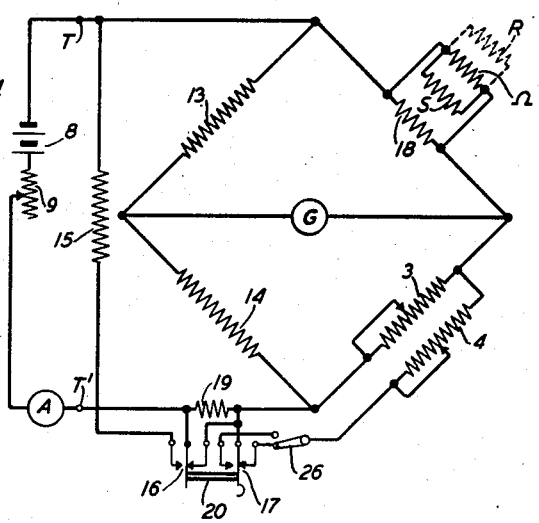
Fig. 4 is a modified form of Fig. 3.

Fig. 4 shows another means of obtaining the two preselected voltages for a bridge such as one of those in Fig. 3 which eliminates the necessity of having to accurately match the second bridge ratio to that of the first bridge. Here switch 7 is omitted and resistor 18 is permanently connected in the bridge. Resistor 18 is included in this bridge in order to limit the resistance of rheostat 3 necessary to obtain balance in the event that the resistance of S is very high. Resistor 18 may be regarded as part of the unknown shunting resistor S and therefore its exact value is immaterial. This bridge is best adaptable to situations wherein the resistances of the measuring arms are high compared with those of the ratio arms. Should the measuring arm resistances be low enough to appreciably alter the current read by ammeter A, this bridge may still be used by substituting a voltage indicator having a linear resistance characteristic for resistor 18 and adjusting rheostat 9 to give the desired preselected voltages as observed by said voltage indicator. The network resistances of the measuring arms comprising S, Ω, R, and resistors 3, 4 and 18 when high may be disregarded when considering the network resistance or impedance as viewed from the power supply terminals T, T'. In this bridge the current through equal ratio arm resistors 13 and 14 is changed by a predetermined amount to give the required two preselected voltages. To accomplish this with precision it is desirable to have the network resistance viewed from terminals T, T' the same after operating switch 20 as it was before. The series resistor 19 and the shunt resistor 15 in combination reduce the current through resistors 13 and 14 and maintain the load on the battery nearly constant as viewed from terminals T, T', when the equal ratio arm resistors 13 and 14 are low compared to the parallel combination of the unknown resistors. The resistances of resistors 15 and 19 are governed by the preselected voltages and resistor 13 as given by the following equations $$R_{19} = \frac{V_2 - V_1}{V_1} \cdot (R_{13} + R_{14}) \quad (7)$$

$$R_{15} = \frac{V_2}{V_2 - V_1} \cdot (R_{13} + R_{14}) \quad (8)$$

where $V_2$ is the higher test voltage and $V_1$ is the lower test voltage and $R_{13}$, $R_{14}$, $R_{15}$ and $R_{19}$ are the resistances of resistors 13, 14, 15 and 19, respectively. Resistors 15 and 19 in combination may be thought of as a pad which does not alter the network resistance but does lower the voltage across resistors 13 and 14.

In operating the bridge of Fig. 4 to measure the varistor of Fig. 2 switch 20 is first operated to impress the lower of the two voltages on the bridge and switch 26 is left as shown. Balance is obtained by rheostat 3. Switch 20 is returned to the position shown in Fig. 4 which raises the bridge voltage to the second preselected value. Balance is again obtained by operating calibrated rheostat 4. The value of R or Ω is obtained from the rheostat 4 as in Fig. 3. As in the bridge of Fig. 3 the alternate operation of omitting rheostat 4, calibrating rheostat 3 and computing Ω from Equation 6 is equally possible.

The bridges of Figs. 3 and 4 as shown are adapted to yield the value of Ω directly and to receive energy from a direct current source. By substituting suitable alternating current instruments and controlled phase angle impedances they may be used for measuring with an alternating current source in place of battery 8.

Fig. 5 schematically represents an elemental constant impedance reflectionless transmission system having inserted between its sending and receiving ends a symmetrical attenuating pad having the same characteristic impedance as the equal sending and receiving end impedances. This pad serves to supply the two necessary preselected voltages indicated on the drawing as $E_1$ and $E_2$, the higher and lower voltages, respectively. P represents the alternating current power source the impedance of which is included in the sending end impedance Z in series therewith. A suitable voltage indicating means V is connected at the receiving end and also has an impedance Z equal to the sending end impedance. The impedance looking into either end of the symmetrical attenuating pad is also Z. It is known for a system of this type that if an insertion loss is introduced by connecting any arbitrary fixed impedance network at terminals A and the power output of source P is adjusted to get a given reading at the receiving end indicator V, this same indication at the receiving end will again be obtained by simply transferring the arbitrary network from A to B. For the special case here discussed this is equivalent to interchanging the sending and receiving ends as can best be understood by referring to the reciprocity theorem which will be found in Transmission Networks and Filters by T. E. Shea, page 52, where the proposition is adequately discussed and proved.

This is made use of in this invention by first designing the pad so that its attenuation in terms of the desired preselected voltages will be $$db = 20 \log \left(\frac{E_1}{E_2}\right) \text{decibels} \quad (9)$$

The permanently shunted impedance is then either connected to the terminals A or B whichever makes the shunted impedance have the lower magnitude. For example, if the varistor of Fig. 2 is to be tested, it is first to be connected to terminals A and would there have the circuit indicated by Fig. 5a where C represents the terminals of the shunted varistor and R, Ω and S are as previously defined. The power source P is adjusted until indicator V reads voltage $E_2$ when $E_1$ according to Equation 9 must exist at terminals A. The fictitious resistance R thereupon appears as defined. The shunted varistor is transferred to terminals B where due to its lower terminal voltage its resistance increases and consequently the voltage at terminals B is no longer equal to $E_2$ which would have been the case had the device been linear. To correct the system so as to return the voltage at terminals B to $E_2$, it will be necessary to parallel the varistor with the rheostat ρ which when adjusted to equal the fictitious resistance R will appear as Fig. 5b. Because the terminal voltage is now $E_2$ fictitious resistance R has disappeared and rheostat ρ has been substituted for it. It will now be seen that all the requirements for the transmission system as well as the principle upon which the method of test is based have been complied with and the fictitious resistance R is measured by rheostat ρ. To restate them briefly the requirements for the transmission system are that the separate elements as set forth must have equal impedances and the variable impedance network to be measured must after it is transferred be adjusted to have the same equivalent network impedance as before it was transferred while the principle of test is that the two voltages to which the variable impedance is subjected must be so selected that the known constant relationship exists as previously defined. If rheostat ρ is calibrated to include the empirical constant $a$ it will thereupon read directly the varistor resistance Ω at voltage $E_2$.

The system of Fig. 5 may be elaborated upon as indicated by Fig. 6 in which the power source P has a constant output. The input to the symmetrical attenuating pad 22 is controlled by a balanced variable attenuator 21 which maintains a constant impedance Z looking into its terminals from either direction although its attenuation may be varied to adjust the receiving end voltage read by V to the desired preselected lower voltage $E_2$. Here again the attenuating pad 22 also has impedance Z looking into it from either direction as has also the wave form correction network 23. This latter network serves to correct the wave form distorted by the non-linear impedance being measured and permits accurate indication by most any type of alternating current voltage indicator V. Correction network 23 and voltage indicator V are designed to indicate the voltage existing at terminals B. The shunted non-linear device is connected to terminal C and it will be noted that transfer key 24 will connect it to either terminals A or B. Another switch 25 connects calibrated rheostat ρ to either terminals A or B, depending upon whether the impedance of the non-linear device decreases or increases with increasing voltage.

The procedure followed in using the system of Fig. 6 is the same as described for Fig. 5 except that the convenience of key 24 and switch 25 is provided and the power is adjusted by attenuator 21 instead of at P directly. If the non-linear impedance increases with increasing voltage, switch 25 is left open and key 24 is first operated downwardly connecting the shunted non-linear device to terminals B. Power control 21 is operated to adjust the receiving voltage as before. Key 24 is then moved upwardly transferring the non-linear device to terminals A where its impedance increases. Switch 25 is moved upwardly to connect calibrated rheostat ρ to terminals A and in parallel with the non-linear device. Calibrated rheostat ρ is then adjusted to reestablish the preselected lower voltage at B whereupon R and Ω is measured as before described.

If the non-linear impedance is such as to decrease with increasing voltage the switching operations are in the reverse order as above described so as to apply the higher voltage first.

Although the systems described in connection with Figs. 5 and 6 have been referred to as alternating current systems, yet it is apparent to one skilled in the art that they are equally adaptable to direct current in which case the power source P would be made a battery or other suitable direct current energy source. Of course, when using them as a direct current system the reactive components of the impedances disappear and should the unknown impedance shunting the non-linear device be pure capacitance it would not enter into the measurements. The results, however, would be the same.

An important factor must be kept in mind in the actual design of the apparatus and while determining the alternating current empirical constant $a$ for the type of non-linear device to be measured. This factor is that the calibrated rheostat ρ for alternating current is actually a calibrated impedance and must be made to follow the same phase angle law as that followed by the fictitious impedance R and $a$, of course, is a complex number which is equal to $$\frac{\Omega - \omega}{\omega}$$

where Ω and ω are as previously defined but are in this instance complex quantities.

What is claimed is:

1. The method of measuring an impedance permanently shunted by an unknown linear impedance, said first-named impedance variable as a function of its terminal voltage, comprising successively impressing upon the terminals of the network formed by said shunted impedance two different known voltages and determining its value from the observed change in network impedance and an empirical constant.

2. The method of measuring the resistance of a resistor permanently shunted by a linear resistor of unknown resistance, said first-named resistance variable as a function of its terminal voltage, comprising measuring the total network current flowing therethrough at two predetermined terminal voltages and determining the resistance of said first-named resistor from the network current readings, predetermined voltages and an empirical constant.

3. The method of measuring the resistance of a resistor permanently shunted by a linear resistor of unknown resistance, said first-named resistance variable as a function of its terminal voltage, comprising connecting said shunted resistor in one arm of a Wheatstone bridge, adjusting the bridge to balance at two different bridge voltages and noting the two corresponding resistance readings, and determining the resistance of the first-named resistor from the said two resistance readings and an empirical constant.

4. The method of measuring the resistance of a resistor permanently shunted by a linear resistor of unknown resistance, said first-named resistance variable as a function of its terminal voltage, comprising connecting said shunted resistor in one arm of a Wheatstone bridge and balancing said bridge at a known bridge voltage by adjusting a rheostat connected in its measuring arm, changing said bridge voltage by a known amount and again balancing said bridge by adjusting a calibrated rheostat temporarily shunting said first-named rheostat and determining the resistance of said first-named resistor from the reading of the calibrated rheostat.

5. A method of measuring an impedance permanently shunted by an unknown linear impedance, said first-named impedance being such that it will decrease as a function of its increasing terminal voltage comprising connecting said shunted impedance across the high voltage terminals of a symmetrical pad of known attenuation, said pad being a part of and inserted between the sending and receiving ends of a constant impedance reflectionless transmission system, adjusting the power input to said transmission system until the receiving voltage at the low voltage terminals of said pad attains a predetermined value, transferring the connection of said shunted impedance from said high voltage terminals to said low voltage terminals and also connecting across said low voltage terminals a calibrated variable impedance, adjusting said calibrated impedance until said receiving voltage again resumes said predetermined value and determining said first-named impedance from the reading of the calibrated variable impedance.

6. A method of measuring an impedance permanently shunted by an unknown linear impedance, said first-named impedance being such that it will increase as a function of its increasing terminal voltage, comprising connecting said shunted impedance across the low voltage terminals of a symmetrical pad of known attenuation, said pad being a part of and inserted between the sending and receiving ends of a constant impedance reflectionless transmission system, adjusting the power imput to said transmission system until the receiving voltage at the low voltage terminals of said pad attains a predetermined value, transferring the connection of said shunted impedance from said low voltage terminals to the high voltage terminals of said pad and also connecting across said high voltage terminals a calibrated variable impedance, adjusting said calibrated impedance until said receiving voltage again resumes said predetermined value, and determining said first-named impedance from the reading of the calibrated variable impedance.

7. A method of measuring an impedance permanently shunted by an unknown linear impedance, said first-named impedance being such that it varies as a function of its terminal voltage, comprising connecting said shunted impedance across one end of a symmetrical pad of known attenuation, said pad being a part of and inserted between the sending and receiving ends of a constant impedance reflectionless transmission system, adjusting the sending power until the received voltage attains a predetermined value, transferring said shunted impedance to the opposite end of said pad and connecting in parallel therewith a calibrated variable impedance, adjusting said calibrated impedance until said received voltage returns to said predetermined value and determining said first-named impedance from the reading of the calibrated variable impedance.

8. A device for measuring an impedance which varies as a function of its terminal voltage and which is permanently shunted by an unknown linear impedance comprising means for successively impressing upon the terminals of the network formed by said shunted impedance two different known voltages, means for observing the resulting change in network impedance, and an indicator operatively associated with said second-named means adapted to indicate directly the value of said first-named impedance.

9. A device for measuring the resistance of a resistor, the resistance of which varies as a function of its terminal voltage and which is permanently shunted by a linear resistor of unknown resistance comprising a Wheatstone bridge having its ratio arms adapted to be switched to either of two different sets of resistance values, means for supplying said ratio arms with a substantially constant current, and a resistance measuring means connected in the measuring arm of said bridge adapted to measure the separate resistances of the resistor to be measured and its shunt.

10. A device for measuring the resistance of a resistor, the resistance of which varies as a function of its terminal voltage and which is permanently shunted by a linear resistor of unknown resistance comprising a Wheatstone bridge having its ratio arms adapted to be switched to either of two different unity ratio resistance values, means for supplying said ratio arms with a substantially constant current, and a resistance measuring means connected in the measuring arm of said bridge adapted to measure the separate resistances of the resistor to be measured and its shunt.

11. A device for measuring the resistance of a resistor, the resistance of which varies as a function of its terminal voltage and which is permanently shunted by a linear resistor of unknown resistance comprising a Wheatstone bridge having its ratio arms adapted to be switched to either of two different sets of resistance values, means for supplying said ratio arms with a substantially constant current, and a resistance measuring means connected in the measuring arms of said bridge comprising essentially a plurality of adjustable resistances adapted to yield directly the resistance of the resistor to be measured.

12. A device for measuring the resistance of a resistor, the resistance of which varies as a function of its terminal voltage and which is permanently shunted by a linear resistor of unknown resistance comprising a Wheatstone bridge having its ratio arms adapted to be switched to either of two different unity ratio resistance values, means for supplying said ratio arms with a substantially constant current, and a resistance measuring means connected in the measuring arms of said bridge comprising essentially a plurality of adjustable resistances adapted to yield directly the resistance of the resistor to be measured.

13. A device for measuring the resistance of a resistor, the resistance of which varies as a function of its terminal voltage and which is permanently shunted by a linear resistor of unknown resistance, comprising a Wheatstone bridge having fixed resistance ratio arms, means for supplying said bridge with two different known voltages, and a resistance measuring means connected in the measuring arm of said bridge adapted to measure the separate resistances of the resistor to be measured and its shunt.

14. A device for measuring an impedance permanently shunted by an unknown linear impedance, said first-named impedance being such that it varies as a function of its terminal voltage comprising a constant impedance reflectionless transmission system having a symmetrical pad of known attenuation between its sending and receiving ends, means for supplying said system at its sending end with a variable amount of power, means associated with its receiving end for observing the receiving end voltage, means for connecting said shunted impedance across the terminals of one end of said pad, means for adjusting the receiving end voltage to a predetermined value by adjusting said sending end power, means for transferring the said shunted impedance to the opposite end of said pad, a calibrated variable impedance connected across said shunted impedance in its transferred position and being also adapted to adjust said receiving end voltage, which adjustment is a measure of said first-named impedance.

15. A device for measuring the resistance of a resistor, the resistance of which varies as a function of its terminal voltage and which is permanently shunted by a linear resistor of unknown resistance comprising a constant resistance transmission system having a symmetrical pad of known attenuation between its sending and receiving ends, means for supplying said system at its sending end with a variable amount of power, means associated with its receiving end for observing the receiving end voltage, means for connecting said shunted resistor across the terminals of one end of said pad, means for adjusting the receiving end voltage to a predetermined value by adjusting said sending end power, means for transferring the said shunted resistor to the opposite end of said pad, a calibrated variable rheostat connected across said shunted resistor in its transferred position and being also adapted to adjust said receiving end voltage, which adjustment is a measure of said first-named resistance.

MASON A. LOGAN.